US005426077A

United States Patent [19]

Brocheton et al.

[11] Patent Number: 5,426,077

[45] Date of Patent: Jun. 20, 1995

[54] HIGH INDEX BROWN PHOTOCHROMIC GLASSES

[75] Inventors: Yves Brocheton, Paris; Michel Prassas, Vulaines S/Seine; Daniel Ricoult, Palaiseau, all of France

[73] Assignee: Corning Incorporated, Corning, N.Y.

[21] Appl. No.: 290,070

[22] Filed: Aug. 15, 1994

[30] Foreign Application Priority Data

Mar. 22, 1994 [FR] France ..................... 94 03344

[51] Int. Cl.[6] ..................... C03C 4/06

[52] U.S. Cl. ..................... 501/13; 501/65; 501/67; 501/72

[58] Field of Search ..................... 501/13, 65, 69, 70, 501/72

[56] References Cited

U.S. PATENT DOCUMENTS 3,208,860 7/1962 Armistead et al. .
3,703,388 11/1972 Araujo et al. .
3,999,996 12/1976 Faulstich et al. .
4,390,635 6/1983 Morgan .
4,486,541 12/1984 Gliemeroth et al. .
4,686,196 8/1987 Gliemeroth et al. .
4,891,336 1/1990 Prassas .
4,980,318 12/1990 Araujo .
5,023,209 6/1991 Grateau et al. .
5,104,831 4/1992 Behr et al. .
5,217,927 6/1993 Behr et al. .

FOREIGN PATENT DOCUMENTS 63790 11/1982 European Pat. Off. .
0353834 2/1990 European Pat. Off. .
0396896 11/1990 European Pat. Off. .
2116164 9/1983 United Kingdom .

*Primary Examiner*—Karl Group
*Attorney, Agent, or Firm*—A. N. Nwaneri

[57] ABSTRACT

This invention is directed to photochromic glasses which darken to a brown coloration upon exposure to actinic radiation, which glasses have a refractive index of about 1.6, an Abbe number between 42–47, a density less than 2.82 g/cm$^3$, and are preferably essentially free of $TiO_2$. The glass compositions consist generally, in weight percent, of:

| | | | | | |
|---|---|---|---|---|---|
| $SiO_2$ | 43–52 | $K_2O$ | 2–9 | $Nb_2O_5$ | 6–16 |
| $B_2O_3$ | 12.5–18 | MgO | 0–5 | Ag | 0.100–0.175 |
| $Al_2O_3$ | 0–3 | CaO | 0–5 | Cl | 0.140–0.350 |
| $ZrO_2$ | 6–14 | SrO | 0–9 | Br | 0.093–0.195 |
| $Li_2O$ | 1.5–3.5 | BaO | 0–9 | CuO | 0.008–0.030. |
| $Na_2O$ | 0–3 | | | | |

7 Claims, No Drawings

HIGH INDEX BROWN PHOTOCHROMIC GLASSES

FIELD OF THE INVENTION

The present invention concerns the preparation of transparent photochromic glasses, which are clear and essentially colorless in their virgin state (faded state), present improved darkening characteristics when exposed to an actinic radiation (generally a ultraviolet source), and display rapid transitions from the darkened to the clear state. The glasses are adequate for the fabrication of ophthalmic lenses and are characterized by a refractive index between 1.585 and 1.610. The possibility exists as well to confer a brown coloration to these glasses in their darkened state.

BACKGROUND OF THE INVENTION

Photochromic glasses were invented some thirty years ago, as described in U.S. Pat. No. 3,208,860 (Armistead et al). Because the main application for photochromic glasses is the fabrication of ophthalmic lenses, extensive research and development work was performed in order to design glass compositions which, not only show fast darkening and fading, but also have a refractive index of 1.523, the industrial standard for common lenses.

However, during the past few years, extensive research was devoted to the development of photochromic glasses of higher refractive index. The very significant benefit resulting from the use of higher refractive index glasses bears on the possibility to reduce the lens thickness, while keeping the same lens corrective power. Several types of compositions were developed, as summarized by the following works:

U.S. Pat. No. 3,703,388 (Araujo) describes the use lanthanum borate compositions containing silver halide; and U.S. Pat. No. 3,999,996 (Faulstich et al) concerns the use of high lead oxide concentrations in aluminoborosilicate base compositions containing silver halide.

For various reasons, the glasses that came out of the first research efforts did not fulfil all commercial expectations. More recent investigations were focused on the use of two or several oxides of the group $TiO_2$, $Nb_2O_5$ and $ZrO_2$, with additions of alkaline earths, in order to raise the refractive index. The addition of $TiO_2$ yields a rapid increase of the refractive index without increasing the glass density as much as BaO, $Nb_2O_5$ and $ZrO_2$ do. The resulting lens is lighter in weight. The most widely sold photochromic ophthalmic lenses having a refractive index of about 1.6 contain over 2% $TiO_2$ in their composition, and are brown in the darkened state. Unfortunately, the presence of $TiO_2$ in these glasses confers a yellowish tint to the glass, which should be essentially colorless in the virgin/faded state. In other words, present commercial photochromic glasses exhibiting refractive indices close to 1.6 and darkening to a brown colour when they are exposed to actinic radiation are not as colorless in their virgin and faded states as commercial photochromic glasses exhibiting a refractive index of 1.523 which darken to a brown colour when they are exposed to actinic radiation.

Consequently, one of the objectives of the present invention was to provide transparent photochromic glasses with refractive indices close to 1.6, which darken to a desired colour when exposed to an actinic radiation, and which fade to an essentially colorless state (at least equivalent to that presented by photochromic glasses exhibiting a refractive index of 1.523), while demonstrating equivalent or improved photochromic performances.

Another objective was to provide glasses of the above described type which display a brown colour in their darkened state and exhibit a virgin/faded coloration less than that of 1.523 index glasses.

SUMMARY OF THE INVENTION

The above objectives can be reached with glasses having base compositions, expressed in weight percent of oxides, consisting essentially of:

| | | | | | |
|---|---|---|---|---|---|
| $SiO_2$ | 43–52 | $Li_2O$ | 1.5–3.5 | CaO | 0–5 |
| $B_2O_3$ | 12.5–18 | $Na_2O$ | 0–3 | SrO | 0–9 |
| $Al_2O_3$ | 0–3 | $K_2O$ | 2–9 | BaO | 0–9 |
| $ZrO_2$ | 6–14 | MgO | 0–5 | $Nb_2O_5$ | 6–16 |
| $TiO_2$ | 0–<2 | | | | |

with following additional conditions:

| | |
|---|---|
| $Li_2O + Na_2O + K_2O (X_2O)$ | 7–12 |
| $MgO + CaO + SrO + BaO (XO)$ | 2–12 |
| $X_2O + XO$ | 12–20 |
| $ZrO_2 + Nb_2O_5 + TiO_2$ | 15–24 |
| $ZrO_2 + Al_2O_3$ | 6–<12 |
| $Nb_2O_5 + Al_2O_3$ | 6–<14 |
| $Li_2O/X_2O$ | 0.15–0.4 |

and of photochromic elements in the following proportions, expressed as weight percentages:

| | | | |
|---|---|---|---|
| Ag | 0.100–0.175 | Br | 0.093–0.200 |
| Cl | 0.140–0.350 | CuO | 0.0080–0.0300 |

with the following conditions:

$Ag + Br > 0.21$ $Br + Cl > 0.24$.

Because $TiO_2$ gives the glass an undesirable yellow colour, the glasses described in the invention are essentially free from this oxide. In other words, although small quantities of $TiO_2$ can be tolerated, its total concentration should not exceed 2% and preferred glasses should be free of this oxide, that is; not more than amounts resulting from impurities.

Although the colour of the invention glasses is naturally aesthetically pleasant, classical colorants, such as CoO, $Er_2O_3$ and $Nd_2O_3$, may be added to the base composition in appropriate amounts that confer the desired colour to the glass.

Beyond the fact that they have a refractive index of about 1.6, the inventive glasses are also characterized by an Abbe number ranging from 42 to 47, a density less than 2.82, excellent chemical durability, and a liquidus viscosity compatible with traditional melting and forming technologies.

The glasses described in the invention can withstand heat treatments required for the deposition of coatings such as anti-reflective coatings. Typically, these treatments require that the glass be heated up to about 280° C., without causing substantial modification of the photochromic performances of the glass. The glasses can also be chemically strengthened (chemtempered) without significant alteration of their photochromic characteristics. Furthermore, the glasses can be heated to a temperature allowing their sagging inside molds, this temperature being higher than the characteristic annealing temperature of the glass. In this case, the photochromic performances are as well not affected.

As observed above, one advantage brought by the addition of $TiO_2$ to the base composition of high index commercial glasses was to raise their refractive index without substantially increasing their density, as BaO, $Nb_2O_5$ and $ZrO_2$ (and indeed PbO) do. The compositions of the inventive glasses are designed in such a way that their density is less than 2.9 and preferably below 2.82 $g/cm^3$.

U.S. Pat. No. 5,023,209 (Grateau et al) describes the fabrication of photochromic glasses containing from 2 to 8% $TiO_2$, which demonstrate a brown colour upon darkening when exposed to actinic radiation. The darkened colour is due to the presence of up to 6 ppm Pd and/or Au, or oxides such as $As_2O_3$, $Sb_2O_3$ and $SnO_2$ in quantities not exceeding 0.15% in weight. These components are useable as well in the present glasses.

The glasses of the invention exhibit the following photochromic properties, when their thickness is 2 mm:

a) a luminous transmittance in their clear state (or faded), designated as $T_0$, greater than or equal to 85%, preferably greater than 87%;

b) a luminous transmittance in their darkened state after exposure for 15 minutes to actinic radiation at room temperature [$T_{D15}$(25° C.)] between 20 and 35%;

c) a difference in luminous transmittance in the darkened state after exposure for 15 minutes to actinic radiation over the temperature range from 25° to 40° C. [$T_{D15}$(40°–25° C.)] of less than 30 points;

d) a fading rate at ambient temperature (25° C.) such that, five minutes after its removal from actinic radiation, the glass presents a luminous transmittance ($T_{F5}$) of at least 60%; and e) a difference in the absolute value of the luminous transmittance (T) in the darkened state, before and after a thermal treatment of one hour at 275° C., of less than 5 points, preferably less than 4 points; this heat treatment simulating the application of an anti-reflective coating on the glass surface.

Because that the darkened colour of glasses described in this invention is naturally grey, one can add to the necessary raw materials small amounts of at least one of the components Pd, Au, $As_2O_3$, $Sb_2O_3$ and $SnO_2$ to assure the development of brown tint, which is commercially more desirable in ophthalmic lenses. To prevent any unwanted coloration of the glass in its clear state, the amount of Pd and/or Au must not exceed 15 ppm (as weighed in the raw material batch). Similarly, the total concentration of $As_2O_3$, $Sb_2O_3$ and $SnO_2$ must not exceed 0.3% (as analyzed in the glass).

The preferred compositions are described below, taking into account for the base compositions and the photochromic elements the same conditions as those mentioned for the broader composition range

| | | | | | |
|---|---|---|---|---|---|
| $SiO_2$ | 43–50 | $Li_2O$ | 1.5–3 | CaO | 0–3 |
| $B_2O_3$ | 12.5–17 | $Na_2O$ | 0.3–2.5 | SrO | 1–7 |
| $Al_2O_3$ | 0–2 | $K_2O$ | 3–8 | BaO | 1–7 |
| $ZrO_2$ | 8–12 | $Nb_2O_5$ | 8–13 | | |
| Ag | 0.110–0.140 | Br | 0.150–0.185 | | |
| Cl | 0.200–0.300 | CuO | 0.011–0.014 | | |

At a thickness of 2 mm the preferred glasses with the addition of at least one of the colorant additives aforementioned exhibit:

f) a colour in their clear state, as defined by chromatic coordinates $x_0$ and $y_0$, so that $x_0 < 0.3150$ and $y_0 < 0.3250$;

g) a brown colour in the darkened state, as defined by chromatic coordinates $x_2$ and $y_{20}$ measured after 20 minutes of exposure to actinic radiation, so that $x_{20} > 0.3300$ and $y_{20} > 0.3250$.

PRIOR ART

The aforementioned U.S. Pat. No. 5,023,209 is representative of commercial photochromic glasses having refractive indices close to 1.6. This patent proposes base glass compositions containing large concentrations in $TiO_2$; the glass compositions of present invention demonstrating, therefore, a significant improvement over those compositions. The glasses of U.S. Pat. No. 5,023,209 had densities lower than 2.8 $g/cm^3$, not noticeably less than those described in present invention.

U.S. Pat. No. 4,891,336 (Prassas) also proposes photochromic glasses with refractive indices close to 1.6 and densities lower than 2.8. The base glass compositions contain large amounts of $TiO_2$.

U.S. Pat. No. 4,980,318 (Araujo) also describes photochromic glasses having refractive indices close to 1.6. The high index is obtained either with a combination of $ZrO_2$ and high amounts of $K_2O$, optionally with $Li_2O$, or with a combination of $ZrO_2$ with lower amounts of $K_2O$ and with an alkaline-earth oxide. $TiO_2$ is considered as a useful optional ingredient and appears in most examples at concentrations ranging from 3 to 10%. As a consequence, although an overlap exists between the ranges claimed by Araujo and those described in the present invention (except for Br content), none of the examples provided in Araujo's patent has a base composition included in the glass composition ranges covered by the present invention.

U.S. Pat. No. 5,104,831 (Behr et al) and U.S. Pat. No. 5,217,927, a continuation of U.S. Pat. No. 5,104,831, describe as well the production of photochromic glasses with refractive indices close to 1.6. However, here again, $TiO_2$ is a necessary component and is present in large quantities.

European Patent No. 63,790 (Schott) proposes a very broad range of photochromic glass compositions with refractive indices larger than 1.59. The ranges of glass components described in this patent overlap the base compositions of the present invention, but the approach used to obtain the high refractive index is totally different from the one described in present invention. For instance, PbO is present in substantial amounts in all examples but one. $TiO_2$ is mentioned as a useful component in concentrations up to 14%. Furthermore, this patent does not require the combination of photochromic elements in quantities such as those precisely limited and defined as critical in present invention.

U.S. Pat. No. 4,486,541 (Gliemeroth et al) uses a combination of PbO, $TiO_2$ and $ZrO_2$ to obtain high refractive index photochromic glasses and U.S. Pat. No. 4,686,196 (Gliemeroth et al) is based on a combination of $TiO_2$, $ZrO_2$ and $Li_2O$ to reach the same objective. Therefore, no patent suggests the $TiO_2$-free glasses described in the present invention.

DESCRIPTION OF PREFERRED EMBODIMENTS

Table I contains glass compositions, expressed as weight percents of oxides, which are good illustrations of the inventive products. Because the sum of individual components totals 100 or is close to this figure, the values indicated in this Table can be taken for all practical purposes as representative of weight percentages. In addition, since the identity of the cation(s) which are combined with the halide elements is unknown and inasmuch as the proportions of these elements are very small, Cl and Br are simply expressed as chlorine and bromine. Finally, because silver is also present in small quantities, it is also expressed, in the same way as Cl and Br, in its elemental form. The values indicated for Cl, Br and Ag are determined by analysis. The amount of CuO is expressed as a batch quantity, based on experience that retention of this oxide is on the order of 98 to 100%.

The actual ingredients of the batch can consist of any type of raw material, oxides or other components, which, when melted together, are converted into the desired oxides and in proper proportions. Cl and Br are generally incorporated into the batch as alkali metal halides. Silver or other components used for coloration purposes are usually added as oxides or appropriate salts.

The batch ingredients are mixed together to provide homogeneity, placed inside a platinum crucible, and Joule-heated at about 1250° C. When melting is completed, the temperature is raised to between 1350° and 1430° C. to obtain glass homogeneity and fining. The melt is then cooled and simultaneously formed into the desired shape, and finally transferred into an annealing furnace operating at about 450° C.

The above description is only relevant to melting and forming in the laboratory, but glasses of the invention can indeed be melted and formed at a larger industrial scale, using classical glass technology processes.

TABLE I

| | 1 | 2 | 3 | 4 | 5 | 6 | 7 | 8 |
|---|---|---|---|---|---|---|---|---|
| $SiO_2$ | 46.1 | 46.1 | 46.1 | 46.1 | 46.1 | 46.1 | 46.1 | 46.1 |
| $B_2O_3$ | 14.5 | 14.5 | 14.5 | 14.5 | 14.5 | 14.5 | 14.5 | 14.5 |
| $ZrO_2$ | 11.5 | 11.5 | 11.5 | 11.5 | 11.5 | 11.5 | 11.5 | 11.5 |
| $Li_2O$ | 1.9 | 1.9 | 1.9 | 1.9 | 1.9 | 1.9 | 1.9 | 1.9 |
| $Na_2O$ | 1.1 | 1.1 | 1.1 | 1.1 | 1.1 | 1.1 | 1.1 | 1.1 |
| $K_2O$ | 5.2 | 5.2 | 5.2 | 5.2 | 5.2 | 5.2 | 5.2 | 5.2 |
| BaO | 5.2 | 5.2 | 5.2 | 5.2 | 5.2 | 5.2 | 5.2 | 5.2 |
| SrO | 1.8 | 1.8 | 1.8 | 1.8 | 1.8 | 1.8 | 1.8 | 1.8 |
| $Nb_2O_5$ | 12.4 | 12.4 | 12.4 | 12.4 | 12.4 | 12.4 | 12.4 | 12.4 |
| Ag | 0.120 | 0.128 | 0.123 | 0.129 | 0.129 | 0.127 | 0.131 | 0.125 |
| Cl | 0.262 | 0.260 | 0.253 | 0.222 | 0.244 | 0.261 | 0.259 | 0.263 |
| Br | 0.155 | 0.161 | 0.162 | 0.165 | 0.159 | 0.178 | 0.173 | 0.163 |
| CuO | 0.011 | 0.011 | 0.011 | 0.011 | 0.011 | 0.011 | 0.011 | 0.011 |
| $Sb_2O_3$ | 0.150 | 0.175 | 0.214 | — | — | — | — | 0.150 |
| Au (ppm) | — | — | — | 9 | 15 | — | — | 6 |
| Pd (ppm) | — | — | — | — | — | 2 | 3 | — |
| Ag + Cl | 0.28 | 0.29 | 0.28 | 0.29 | 0.29 | 0.30 | 0.30 | 0.29 |
| Cl + Br | 0.42 | 0.42 | 0.41 | 0.39 | 0.40 | 0.44 | 0.43 | 0.43 |

| | 9 | 10 | 11 | 12 | 13 | 14 | 15 |
|---|---|---|---|---|---|---|---|
| $SiO_2$ | 46.1 | 46.1 | 46.1 | 46.1 | 46.1 | 46.1 | 46.5 |
| $B_2O_3$ | 14.5 | 14.5 | 14.5 | 14.5 | 14.5 | 14.5 | 14.6 |
| $ZrO_2$ | 11.5 | 11.5 | 11.5 | 11.5 | 11.5 | 11.5 | 9.5 |
| $Li_2O$ | 1.9 | 1.9 | 1.9 | 1.9 | 1.9 | 1.9 | 1.9 |
| $Na_2O$ | 1.1 | 1.1 | 1.1 | 1.1 | 1.1 | 1.1 | 1.1 |
| $K_2O$ | 5.2 | 5.2 | 5.2 | 5.2 | 5.2 | 5.2 | 5.2 |
| BaO | 5.2 | 5.2 | 5.2 | 5.2 | 5.2 | 5.2 | 5.2 |
| SrO | 1.8 | 1.8 | 1.8 | 1.8 | 1.8 | 1.8 | 1.8 |
| $TiO_2$ | — | — | — | — | — | — | 1.4 |
| $Nb_2O_5$ | 12.4 | 12.4 | 12.4 | 12.4 | 12.4 | 12.4 | 12.5 |
| Ag | 0.125 | 0.130 | 0.131 | 0.127 | 0.122 | 0.123 | 0.134 |
| Cl | 0.258 | 0.273 | 0.260 | 0.250 | 0.265 | 0.261 | 0.257 |
| Br | 0.158 | 0.160 | 0.165 | 0.166 | 0.170 | 0.176 | 0.159 |
| CuO | 0.011 | 0.011 | 0.011 | 0.011 | 0.011 | 0.011 | 0.011 |
| $Sb_2O_3$ | 0.151 | 0.151 | 0.075 | 0.34 | 0.072 | 0.186 | 0.079 |
| Au (ppm) | 9 | 12 | 15 | — | — | — | 15 |
| Pd (ppm) | — | — | — | 1 | 2 | 3 | |
| Ag + Cl | 0.28 | 0.29 | 0.30 | 0.29 | 0.29 | 0.30 | 0.39 |
| Cr + Br | 0.42 | 0.43 | 0.42 | 0.42 | 0.43 | 0.44 | 0.42 |

Samples cut from the annealed glass articles were introduced into an electrically heated furnace and exposed for the durations in minutes and at the temperatures in °C. recorded in Table II, in order to develop photochromic properties. Generally, temperatures between 670° and 700° C. proved to be satisfactory to develop the desired properties.

Table II also shows measurements of photochromic behaviour, as well as colour of the glasses, their refractive index (I.R.), their Abbe number (Abbe) and their density (Dens.) in g/cm$^3$, when these properties have been measured.

Colour of the glasses is defined according to the CIE trichromatic system (1931), using White C as light source; this colorimetric system and the light source are described by A. C. Hardy in *Handbook of Colorimetry*, Technology Press, M.I.T., Cambridge, Mass., USA (1936).

The colour of the glass in the darkened state ($x_{20}$,$y_{20}$) is determined after exposure of ground and polished samples during 20 minutes at 25° C. to a UV light source (BLB). The corresponding transmittance is designed by $T_{D20}$. The colour of the glass in the clear state ($T_0$) is determined in the absence of the light source.

Luminous transmittance most representative of the photochromic behaviour of the glass under the action of an actinic radiation similar to the solar spectrum was measured with a solar simulator, the principle of which was described in U.S. Pat. No. 4,190,451 (Hares et al). These results are listed in Table II under the title "Solar simulator".

For the sake of comparison, Table II also contains an example of commercial photochromic glass (labelled PBX) having a refractive index of 1.523 and darkening into a brown colour when exposed to an actinic radiation, as well as an example of commercial photochromic glass with refractive index 1.6 (labelled PB16), which demonstrates a brown colour upon darkening in the presence of an actinic radiation.

In Table II:

- $T_0$ denotes the luminous transmittance of a glass in its clear state (not darkened);
- DT denotes the absolute difference in luminous transmittance in the darkened state before and after a thermal treatment simulating vacuum deposition of a coating (one hour at 280° C.);
- $T_{D15}$(25° C.) denotes the luminous transmittance in the darkened state of a glass after an exposure for 15 minutes at 25° C. to actinic radiation representative of the solar spectrum;
- $T_{D15}$(40° C.) denotes the luminous transmittance in the darkened state of a glass after an exposure for 15 minutes at 40° C. to actinic radiation representative of the solar spectrum;
- $T_{F5}$(25° C.) denotes the luminous transmittance after fading of a glass five minutes after removal of the actinic radiation simulating solar radiation at 25° C.; and
- $DT_{D15}$(40–25) denotes the difference in luminous transmittance in the darkened state of a glass over the temperature interval 25° to 40° C.

Measurements of refractive index and Abbe number were performed on annealed samples according to classical methods (yellow He ray was used for $n_D$).

Density was measured by immersion.

Examples 1 to 3 are representative of photochromic glass compositions containing $Sb_2O_3$ as only colorant.

Examples 4 and 5 are representative of photochromic glass compositions containing Au as only colorant.

Examples 6 and 7 are representative of photochromic glass compositions containing Pd as only colorant.

Examples 8 to 11 are representative of photochromic glass compositions containing both $Sb_2O_3$ and Pd as colorants.

Example 15 shows that $TiO_2$ can be tolerated in small amount, but should preferably be absent.

Examples 1 to 15 illustrate preferred embodiments of present invention, not only for their photochromic properties, but also because they can be formed as lens blanks by sagging for ophthalmic applications.

The behaviour of photochromic glasses is essentially unchanged after the sagging process.

TABLE II

| Heat Treatment | 1 | 2 | 3 | 4 | 5 | 6 |
|---|---|---|---|---|---|---|

TABLE II-continued

| | | | | | | |
|---|---|---|---|---|---|---|
| Temperature | 690 | 690 | 690 | 690 | 690 | 690 |
| Time | 15 | 15 | 15 | 15 | 15 | 15 |
| $T_0$(BLB) | 88.6 | 88.2 | 88.0 | 88.6 | 89.2 | 88.9 |
| $x_0$ | 0.3133 | 0.3139 | 0.3138 | 0.3126 | 0.3126 | 0.3118 |
| $y_0$ | 0.3031 | 0.3230 | 0.3232 | 0.3228 | 0.3226 | 0.3226 |
| $T_{D20}$ | 41.5 | 38.3 | 40.2 | 37.1 | 38.5 | 39.3 |
| $x_{20}$ | 0.3389 | 0.3391 | 0.3377 | 0.3419 | 0.3416 | 0.3308 |
| $y_{20}$ | 0.3313 | 0.3306 | 0.3299 | 0.3319 | 0.3329 | 0.3271 |
| DT | −0.9 | +1.8 | −1.2 | +0.5 | −2.0 | −2.0 |
| $T_0$ | 87.1 | 87.7 | 87.6 | 88.0 | 87.1 | 87.8 |
| $T_{D15}$(25° C.) | 23.1 | 25.3 | 28.3 | 24.8 | 24.9 | 27.5 |
| $T_{D15}$(40° C.) | 45.1 | — | — | — | — | — |
| $T_{F5}$(25° C.) | 62.0 | 62.9 | 64.7 | 61.5 | 60.1 | 61.7 |
| $\Delta T_{D15}$(40–25) | — | — | — | — | — | — |
| R.I. | 1.599 | — | — | — | — | — |
| Abbe | 45.3 | — | — | — | — | — |
| Dens. | 2.81 | — | — | — | — | — |

| Heat Treatment | 7 | 8 | 9 | 10 | 11 | 12 |
|---|---|---|---|---|---|---|
| Temperature | 690 | 700 | 690 | 690 | 690 | 690 |
| Time | 15 | 15 | 15 | 15 | 15 | 15 |
| $T_0$(BLB) | 88.9 | 88.8 | 88.6 | 88.5 | 87.0 | 88.7 |
| $x_0$ | 0.3125 | 0.3127 | 0.3134 | 0.3134 | 0.3149 | 0.3129 |
| $y_0$ | 0.3226 | 0.3230 | 0.3232 | 0.3234 | 0.3245 | 0.3227 |
| $T_{D20}$ | 37.2 | 41.8 | 39.1 | 37.8 | 35.9 | 38.7 |
| $x_{20}$ | 0.3319 | 0.3400 | 0.3473 | 0.3493 | 0.3428 | 0.3401 |
| $y_{20}$ | 0.3282 | 0.3317 | 0.3353 | 0.3362 | 0.3333 | 0.3318 |
| DT | −2.2 | +0.2 | +1.3 | −2.4 | −1.9 | +0.3 |
| $T_0$ | 89.3 | 87.4 | 87.3 | 86.7 | 87.4 | 88.2 |
| $T_{D15}$(25° C.) | 25.9 | 26.8 | 25.8 | 24.7 | 26.2 | 26.0 |
| $T_{D15}$(40° C.) | — | — | — | — | — | — |
| $T_{F5}$(25° C.) | 60.1 | 64.3 | 63.6 | 61.8 | 62.3 | 63.5 |
| $\Delta T_{D15}$40–25) | — | — | — | — | — | — |
| R.I. | — | — | — | — | — | — |
| Abbe | — | — | — | — | — | — |
| Dens. | — | — | — | — | — | — |

| Heat Treatment | 13 | 14 | 15 | PBX | PB16 |
|---|---|---|---|---|---|
| Temperature | 690 | 690 | 690 | 690 | 690 |
| Time | 15 | 15 | 15 | — | — |
| $T_0$(BLB) | 88.0 | 87.2 | 87.4 | 88.4 | 86.6 |
| $x_0$ | 0.3125 | 0.3143 | 0.3145 | 0.3155 | 0.3164 |
| $y_0$ | 0.3237 | 0.3239 | 0.3246 | 0.3230 | —/3258 |
| $T_{D20}$ | 41.5 | 42.7 | 41.0 | 37.1 | 48.2 |
| $x_{20}$ | 0.3380 | 0.3344 | 0.3380 | 0.3443 | 0.3302 |
| $y_{20}$ | 0.3309 | 0.3290 | 0.3297 | 0.3383 | 0.3278 |
| DT | +1.2 | −0.8 | — | — | — |
| $T_0$ | 87.9 | 86.9 | 87.8 | 87.9 | 85.7 |
| $T_{D15}$(25° C.) | 27.2 | 31.5 | 27.5 | 28.1 | 33.0 |
| $T_{D15}$(40° C.) | — | — | — | 47.8 | 50.1 |
| $T_{F5}$(40–25) | 63.9 | 67.3 | 62.7 | 67.0 | 66.7 |
| $\Delta T_{15}$(40–25) | — | — | — | 38.9 | 33.7 |
| R.I. | — | — | — | 1.523 | 1.600 |
| Abbe | — | — | — | 56.4 | 42.2 |
| Dens. | — | — | — | 2.41 | 2.70 |

As one can see from Table II, glasses from the present invention have photochromic properties at least equivalent to, and in certain cases better than those of a commercial photochromic glass with refractive index 1.523. When compared to the commercial 1.6 photochromic glasses, not only do glasses of the present invention have a higher transmittance in the clear state, but they also have better darkening and fading performances.

The most preferred embodiment currently is Example 12.

What is claimed is:

1. A photochromic glass which darkens when exposed to actinic radiation having a refractive index between 1.585 and 1.610, an Abbe number between 42 and 47, and a density less than 2.82 g/cm³, which glass, at a thickness of 2 mm, has the following photochromic properties:

a) a luminous transmittance in the clear state ($T_0$) equal to or greater than 85%;

b) a luminous transmittance in the darkened state after an exposure of 15 minutes to actinic radiation at 25° C., between 20 and 35%;

c) a difference in luminous transmittance in the darkened state after a 15 minute exposure to actinic radiation over the temperature range 25° to 40° C. of less than 30 points;

d) a fading rate at 25° C. such that the glass presents a luminous transmittance five minutes after removal from the actinic light source ($T_{F5}$) of at least 60%; and e) a difference in absolute value of luminous transmittance in the darkened state (DT), before and after thermal treatment during one hour at 280° C., of less than five points;

said glass consisting essentially, expressed in weight percent of oxides, of:

| | | | | | | | |
|---|---|---|---|---|---|---|---|
| $SiO_2$ | 43-52 | $Li_2O$ | 1.5-3.5 | CaO | 0-5 | | |
| $B_2O_3$ | 12.5-18 | $Na_2O$ | 0-3 | SrO | 0-9 | | |
| $Al_2O_3$ | 0-3 | $K_2O$ | 2-9 | BaO | 0-9 | | |
| $ZrO_2$ | 6-14 | MgO | 0-5 | $Nb_2O_5$ | 6-16 | | |
| $TiO_2$ | 0-<2 | | | | | | |

with following additional conditions:

| | |
|---|---|
| $Li_2O + Na_2O + K_2O(X_2O)$ | 7-12 |
| $MgO + CaO + SrO + BaO(XO)$ | 2-12 |
| $X_2O + XO$ | 12-20 |
| $ZrO_2 + Nb_2O_5 + TiO_2$ | 15-24 |
| $ZrO_2 + Al_2O_3$ | 6-<12 |
| $Nb_2O_5 + Al_2O_3$ | 6-<14 |
| $Li_2O/X_2O$ | 0.15-0.4 |

and of photochromic elements in the following proportions, expressed as weight percentages:

| | | | |
|---|---|---|---|
| Ag | 0.100-0.175 | Br | 0.093-0.200 |
| Cl | 0.140-0.350 | CuO | 0.0080-0.0300 |

with the following conditions:

$Ag + Br > 0.21$ $Br + Cl > 0.24$.

2. A photochromic glass according to claim 1, which is brown in the darkened state and essentially colorless in the clear state, the composition of which contains in addition at least one colorant additive selected from the group consisting of Pd, Au, $As_2O_3$ and $SnO_2$, the total of Pd and Au not exceeding 15 ppm, as measured in the starting raw material batch, and the total of $As_2O_3$, $Sb_2O_3$ and $SnO_2$ not exceeding 0.3% in weight, as analyzed in the glass.

3. A photochromic glass according to claim 1, in which the luminous transmittance in the clear state is greater than 87%, said glass being essentially free from $TiO_2$ and consisting essentially of:

| | | | | | |
|---|---|---|---|---|---|
| $SiO_2$ | 43-50 | $Li_2O$ | 1.5-3 | CaO | 0-3 |
| $B_2O_3$ | 12.5-17 | $Na_2O$ | 0.3-2.5 | SrO | 1-7 |
| $Al_2O_3$ | 0-2 | $K_2O$ | 3-8 | BaO | 1-7 |
| $ZrO_2$ | 8-12 | $Nb_2O_5$ | 8-13 | | |

and of photochromic elements:

-continued

| | | | |
|---|---|---|---|
| Ag | 0.110-0.140 | Br | 0.150-0.185 |
| Cl | 0.200-0.300 | CuO | 0.011-0.014. |

4. A photochromic glass according to claim 3, which is brown in the darkened state and essentially colorless in the clear state, the composition of which contains in addition at least one colorant additive selected from the group consisting of Pd, Au, $As_2O_3$ and $SnO_2$, the total of Pd and Au not exceeding 15 ppm, as measured in the starting raw material batch, and the total of $As_2O_3$, $Sb_2O_3$ and $SnO_2$ not exceeding 0.3% in weight, as analyzed in the glass.

5. A photochromic glass according to claim 2, which, at a thickness of 2 mm with the addition of at least one of said colorant additives, exhibits:

a) a colour in the clear state, defined by the chromatic coordinates $x_0$ and $y_0$, such that $x_0 < 0.3150$ and $y_0 < 0.3250$; and b) a brown colour in the darkened state, defined by the chromatic coordinates $x_{20}$ and $y_{20}$, measured after 20 minutes exposure to actinic radiation, such that $x_{20} > 0.3300$ and $y_{20} > 0.3250$.

6. A photochromic glass according to claim 4 which, at a thickness of 2 mm with the addition of at least one of said colorant additives, exhibits:

a) a colour in the clear state, defined by the chromatic coordinates $x_0$ and $y_0$, such that $x_0 < 0.3150$ and $y_0 < 0.3250$; and b) a brown colour in the darkened state, defined by the chromatic coordinates $x_{20}$ and $y_{20}$, measured after 20 minutes exposure to actinic radiation, such that $x_{20} > 0.3300$ and $y_{20} > 0.3250$.

7. An ophthalmic lens consisting of a photochromic glass which darkens when exposed to actinic radiation having a refractive index between 1.585 and 1.610, an Abbe number between 42 and 47, and a density less than 2.82 g/cm$^3$, which glass, at a thickness of 2 mm, has the following photochromic properties:

a) a luminous transmittance in the clear state ($T_0$) equal to or greater than 85%;

b) a luminous transmittance in the darkened state after an exposure of 15 minutes to actinic radiation at 25° C., between 20 and 35%;

c) a difference in luminous transmittance in the darkened state after a 15 minute exposure to actinic radiation over the temperature range 25° to 40° C. of less than 30 points;

d) a fading rate at 25° C. such that the glass presents a luminous transmittance five minutes after removal from the actinic light source ($T_{F5}$) of at least 60%; and e) a difference in absolute value of luminous transmittance in the darkened state (DT), before and after thermal treatment during one hour at 280° C., of less than five points;

said glass consisting essentially, expressed in weight percent of oxides, of:

| | | | | | |
|---|---|---|---|---|---|
| $SiO_2$ | 43-52 | $Li_2O$ | 1.5-3.5 | CaO | 0-5 |
| $B_2O_3$ | 12.5-18 | $Na_2O$ | 0-3 | SrO | 0-9 |
| $Al_2O_3$ | 0-3 | $K_2O$ | 2-9 | BaO | 0-9 |
| $ZrO_2$ | 6-14 | MgO | 0-5 | $Nb_2O_5$ | 6-16 |
| $TiO_2$ | 0-<2 | | | | |

with following additional conditions:

| | |
|---|---|
| $Li_2O + Na_2O + K_2O(X_2O)$ | 7–12 |
| $MgO + CaO + SrO + BaO(XO)$ | 2–12 |
| $X_2O + XO$ | 12–20 |
| $ZrO_2 + Nb_2O_5 + TiO_2$ | 15–24 |
| $ZrO_2 + Al_2O_3$ | 6–<12 |
| $Nb_2O_5 + Al_2O_3$ | 6–<14 |
| $Li_2O/X_2O$ | 0.15–0.4 |

and of photochromic elements in the following proportions, expressed as weight percentages:

| | | | |
|---|---|---|---|
| Ag | 0.100–0.175 | Br | 0.093–0.200 |
| Cl | 0.140–0.350 | CuO | 0.0080–0.0300 |

with the following conditions:

$Ag + Br > 0.21$ $Br + Cl > 0.24$.

* * * * *

UNITED STATES PATENT AND TRADEMARK OFFICE
CERTIFICATE OF CORRECTION

PATENT NO. : 5,426,077

DATED : Jun. 20, 1995

INVENTOR(S) : Yves Brocheton, Michel Prassas, Daniel Ricoult

It is certified that error appears in the above-identified patent and that said Letters Patent is hereby corrected as shown below:

Column 9, line 3, after "25° C.", Page 16, line 10
insert --$[T_{D15}(25°C)]$ --.

Column 9, line 6, after "40° C.", Page 16, line 14
insert --$[T_{D15}(40-25)]$ --.

Column 10, line 45, after "25° C.", Page 18, line 32
insert --$[T_{D15}(25°C)]$ --.

Column 10, line 48, after "40° C.", Page 18, line 36
insert --$[T_{D15}(40-25)]$ --.

Signed and Sealed this

Tenth Day of October, 1995

Attest:

BRUCE LEHMAN

*Attesting Officer* *Commissioner of Patents and Trademarks*